United States Patent
Perantoni et al.

(10) Patent No.: US 10,174,833 B2
(45) Date of Patent: Jan. 8, 2019

(54) VEHICLE DECELERATION CONTROL SYSTEMS AND METHODS

(71) Applicant: GM Global Technology Operations LLC, Detroit, MI (US)

(72) Inventors: Greg J. Perantoni, Fenton, MI (US); Brian J. Pellerito, Ortonville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 492 days.

(21) Appl. No.: 14/978,333

(22) Filed: Dec. 22, 2015

(65) Prior Publication Data

US 2017/0175882 A1  Jun. 22, 2017

(51) Int. Cl.
*F16H 61/12* (2010.01)
*F16H 59/14* (2006.01)
(Continued)

(52) U.S. Cl.
CPC ............ *F16H 61/12* (2013.01); *F16H 59/14* (2013.01); *F16H 59/48* (2013.01); *F16H 59/52* (2013.01); *F16H 59/54* (2013.01); *F16H 61/0021* (2013.01); *F16H 61/0204* (2013.01); *F16H 61/16* (2013.01); *F16H 2059/142* (2013.01); *F16H 2059/147* (2013.01); *F16H 2059/148* (2013.01); *F16H 2061/0241* (2013.01);
(Continued)

(58) Field of Classification Search
CPC ....... F16H 2061/168; F16H 2061/1204; F16H 2061/1224; F16H 2061/1232; F16H 2061/1276; F16H 2061/0241; F16H 61/16; F16H 61/12; F16H 61/0204
See application file for complete search history.

(56) References Cited

U.S. PATENT DOCUMENTS 5,980,426 A    11/1999  Kamada et al.
7,559,873 B2 *  7/2009  Thor ................. F16H 61/12
                                          477/156
(Continued)

FOREIGN PATENT DOCUMENTS

CN    1624360 A    6/2005
CN    1654245 A    8/2005
(Continued)

OTHER PUBLICATIONS

First Office Action for Chinese Application No. 201611153552.1 dated Mar. 27, 2018; 5 pages. No translation available.

*Primary Examiner* — Erin D Bishop (57) ABSTRACT

A transmission control system of a vehicle includes an estimated acceleration module and a pressure control module. The estimated acceleration module determines an estimated longitudinal acceleration of the vehicle based on a force at axles of the vehicle corresponding to engine torque, a braking force imposed by mechanical brakes of the vehicle, an aerodynamic drag force of the vehicle, and a road load force imposed on the vehicle by contact between tires of the vehicle and a road surface. The pressure control module, when a measured longitudinal acceleration of the vehicle is negative and the estimated longitudinal acceleration is greater than the measured longitudinal acceleration of the vehicle, adjusts transmission fluid pressure applied to one or more clutches of the transmission and shifts the transmission to neutral.

20 Claims, 3 Drawing Sheets

(51) Int. Cl.
    *F16H 59/48*     (2006.01)
    *F16H 59/52*     (2006.01)
    *F16H 59/54*     (2006.01)
    *F16H 61/00*     (2006.01)
    *F16H 61/02*     (2006.01)
    *F16H 61/16*     (2006.01)

(52) U.S. Cl.
    CPC ........... *F16H 2061/1204* (2013.01); *F16H 2061/1232* (2013.01); *F16H 2061/1276* (2013.01); *F16H 2061/168* (2013.01)

(56) References Cited

U.S. PATENT DOCUMENTS

| | | | |
|---|---|---|---|
| 7,637,844 B2 * | 12/2009 | Tasaka | F16H 61/12 477/107 |
| 7,980,981 B2 * | 7/2011 | Kawaguchi | F16H 61/12 475/116 |
| 9,453,575 B2 * | 9/2016 | Eto | F16H 61/16 |

FOREIGN PATENT DOCUMENTS

| | | |
|---|---|---|
| CN | 101994820 A | 3/2011 |
| JP | H1096465 A | 4/1998 |
| JP | 2003194202 A | 7/2003 |

* cited by examiner

VEHICLE DECELERATION CONTROL SYSTEMS AND METHODS

FIELD

The present disclosure relates to vehicle transmissions and more particularly to systems and methods for systems and methods for controlling transmissions based on vehicle deceleration.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine generates torque, which is output to a transmission. An automatic transmission of a vehicle may include a plurality of fluid controlled friction devices, such as clutches. A control module may engage and disengage one or more of the clutches according to a predefined pattern to establish different gear ratios (also called speed ratios) within the transmission.

A gear ratio may be defined in terms of a ratio of a transmission input shaft speed divided by a transmission output shaft speed. A gear shift from one gear ratio to another gear ratio involves disengaging a first clutch that is associated with the current or actual gear ratio, and engaging a second clutch associated with a next gear ratio. The clutch to be disengaged during the gear shift is referred to as the offgoing clutch, and the clutch to be engaged during the gear shift is referred to as the oncoming clutch. Gear shifts of this type may be referred to as clutch-to-clutch shifts.

SUMMARY

In a feature, a transmission control system of a vehicle is described. An estimated acceleration module determines an estimated longitudinal acceleration of the vehicle based on a force at axles of the vehicle corresponding to engine torque, a braking force imposed by mechanical brakes of the vehicle, an aerodynamic drag force of the vehicle, and a road load force imposed on the vehicle by contact between tires of the vehicle and a road surface. A pressure control module, when a measured longitudinal acceleration of the vehicle is negative and the estimated longitudinal acceleration is greater than the measured longitudinal acceleration of the vehicle, adjusts transmission fluid pressure applied to one or more clutches of the transmission and shifts the transmission to neutral.

In further features, the estimated acceleration module determines the estimated longitudinal acceleration of the vehicle further based on a mass of the vehicle.

In further features, the estimated acceleration module: determines a total force on the vehicle based on a sum of: (i) the force at the axles of the vehicle corresponding to engine torque, (ii) the braking force imposed by the mechanical brakes of the vehicle, (iii) the aerodynamic drag force on the vehicle, and (iv) the road load force imposed on the vehicle; and sets the estimated longitudinal acceleration of the vehicle based on the total force on the vehicle divided by a mass of the vehicle.

In further features, a measured acceleration module determines the measured longitudinal acceleration of the vehicle based on a change in a transmission output shaft speed over a period.

In further features, a measured acceleration module determines the measured longitudinal acceleration of the vehicle based on signals generated by a longitudinal acceleration sensor of the vehicle.

In further features, a first measured acceleration module determines the measured longitudinal acceleration of the vehicle based on a change in a transmission output shaft speed over a period. A second measured acceleration module determines a second measured longitudinal acceleration of the vehicle based on signals generated by a longitudinal acceleration sensor of the vehicle. The pressure control module adjusts the transmission fluid pressure applied to the one or more clutches of the transmission and shifts the transmission to neutral when: both the measured longitudinal acceleration and the second measured longitudinal acceleration are negative; and the estimated longitudinal acceleration is greater than both (i) the measured longitudinal acceleration of the vehicle and (ii) the second measured longitudinal acceleration of the vehicle.

In further features, the pressure control module adjusts the transmission fluid pressure applied to the one or more clutches of the transmission and shifts the transmission to neutral when, for at least a predetermined period: both the measured longitudinal acceleration and the second measured longitudinal acceleration are negative; and the estimated longitudinal acceleration is greater than both (i) the measured longitudinal acceleration of the vehicle and (ii) the second measured longitudinal acceleration of the vehicle.

In further features, the pressure control module adjusts the transmission fluid pressure applied to the one or more clutches of the transmission and shifts the transmission to neutral when, for at least a predetermined period: both the measured longitudinal acceleration and the second measured longitudinal acceleration are negative; and the estimated longitudinal acceleration is, by at least a predetermined amount, greater than both: (i) the measured longitudinal acceleration of the vehicle and (ii) the second measured longitudinal acceleration of the vehicle.

In further features, when the measured longitudinal acceleration of the vehicle is negative and the estimated longitudinal acceleration is greater than the measured longitudinal acceleration of the vehicle, the pressure control module further adjusts transmission fluid pressure applied to one or more of the clutches of the transmission and shifts the transmission to a predetermined gear ratio.

In further features, the pressure control module actuates one or more control valves of the transmission to adjust the transmission fluid pressure(s) applied to the one or more clutches of the transmission and shift the transmission to neutral.

In a feature, a transmission control method for a vehicle includes: determining an estimated longitudinal acceleration of the vehicle based on: a force at axles of the vehicle corresponding to engine torque, a braking force imposed by mechanical brakes of the vehicle, an aerodynamic drag force of the vehicle, and a road load force imposed on the vehicle by contact between tires of the vehicle and a road surface; and, when a measured longitudinal acceleration of the vehicle is negative and the estimated longitudinal acceleration is greater than the measured longitudinal acceleration of the vehicle, adjusting transmission fluid pressure applied to one or more clutches of the transmission and shifting the transmission to neutral.

In further features, the transmission control method further includes determining the estimated longitudinal acceleration of the vehicle further based on a mass of the vehicle.

In further features, determining the estimated longitudinal acceleration comprises: determining a total force on the vehicle based on a sum of: (i) the force at the axles of the vehicle corresponding to engine torque, (ii) the braking force imposed by the mechanical brakes of the vehicle, (iii) the aerodynamic drag force on the vehicle, and (iv) the road load force imposed on the vehicle; and setting the estimated longitudinal acceleration of the vehicle based on the total force on the vehicle divided by a mass of the vehicle.

In further features, the transmission control method further includes determining the measured longitudinal acceleration of the vehicle based on a change in a transmission output shaft speed over a period.

In further features, the transmission control method further includes determining the measured longitudinal acceleration of the vehicle based on signals generated by a longitudinal acceleration sensor of the vehicle.

In further features, the transmission control method further includes: determining the measured longitudinal acceleration of the vehicle based on a change in a transmission output shaft speed over a period; and determining a second measured longitudinal acceleration of the vehicle based on signals generated by a longitudinal acceleration sensor of the vehicle, wherein adjusting the transmission fluid pressure applied to the one or more clutches of the transmission and shifting the transmission to neutral includes adjusting the transmission fluid pressure applied to the one or more clutches of the transmission and shifting the transmission to neutral when: both the measured longitudinal acceleration and the second measured longitudinal acceleration are negative; and the estimated longitudinal acceleration is greater than both (i) the measured longitudinal acceleration of the vehicle and (ii) the second measured longitudinal acceleration of the vehicle.

In further features, adjusting the transmission fluid pressure applied to the one or more clutches of the transmission and shifting the transmission to neutral includes adjusting the transmission fluid pressure applied to the one or more clutches of the transmission and shifting the transmission to neutral when, for at least a predetermined period: both the measured longitudinal acceleration and the second measured longitudinal acceleration are negative; and the estimated longitudinal acceleration is greater than both (i) the measured longitudinal acceleration of the vehicle and (ii) the second measured longitudinal acceleration of the vehicle.

In further features, adjusting the transmission fluid pressure applied to the one or more clutches of the transmission and shifting the transmission to neutral includes adjusting the transmission fluid pressure applied to the one or more clutches of the transmission and shifting the transmission to neutral when, for at least a predetermined period: both the measured longitudinal acceleration and the second measured longitudinal acceleration are negative; and the estimated longitudinal acceleration is, by at least a predetermined amount, greater than both: (i) the measured longitudinal acceleration of the vehicle and (ii) the second measured longitudinal acceleration of the vehicle.

In further features, the transmission control method further includes, when the measured longitudinal acceleration of the vehicle is negative and the estimated longitudinal acceleration is greater than the measured longitudinal acceleration of the vehicle, further adjusting transmission fluid pressure applied to one or more of the clutches of the transmission and shifting the transmission to a predetermined gear ratio.

In further features, adjusting the transmission fluid pressure applied to the one or more clutches of the transmission and shifting the transmission to neutral includes actuating one or more control valves of the transmission to adjust the transmission fluid pressure(s) applied to the one or more clutches of the transmission and shift the transmission to neutral.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Clutch-to-clutch transmissions of vehicles perform gear shifts by disengaging an offgoing clutch and applying an oncoming clutch. Under some circumstances, a clutch that should not be applied to achieve a present gear ratio may be at least partially applied. Application of a clutch that should not be applied may be referred to as tie-up and may cause deceleration of a vehicle.

A transmission control module may monitor measured longitudinal deceleration of the vehicle, such as deceleration measured using a transmission output shaft speed sensor and/or a longitudinal acceleration sensor. The transmission control module may identify tie-up when the measured longitudinal deceleration is more negative than a predetermined value. Such measured longitudinal decelerations, however, do not account for other forces on the vehicle that cause or increase vehicle deceleration.

The transmission control module according to the present disclosure determines an estimated longitudinal acceleration of the vehicle based on a plurality of forces urging deceleration of the vehicle. For example, the transmission control module may determine the estimated longitudinal acceleration of the vehicle based on deceleration force provided by the engine, deceleration force attributable to application of mechanical brakes, deceleration force attributable to aerodynamic drag of the vehicle, and deceleration force attributable to friction between tires of the vehicle and the road.

The transmission control module identifies tie-up when the measured longitudinal acceleration is negative (indicating deceleration) and the estimated longitudinal acceleration is greater than the measured longitudinal acceleration by at least a predetermined amount. The transmission control module takes one or more remedial actions when tie-up occurs. For example, the transmission control module may shift the transmission to neutral, identifying a clutch that is at least partially applied when it should not be, and shifting to a gear ratio associated with that clutch.

Figure 1:
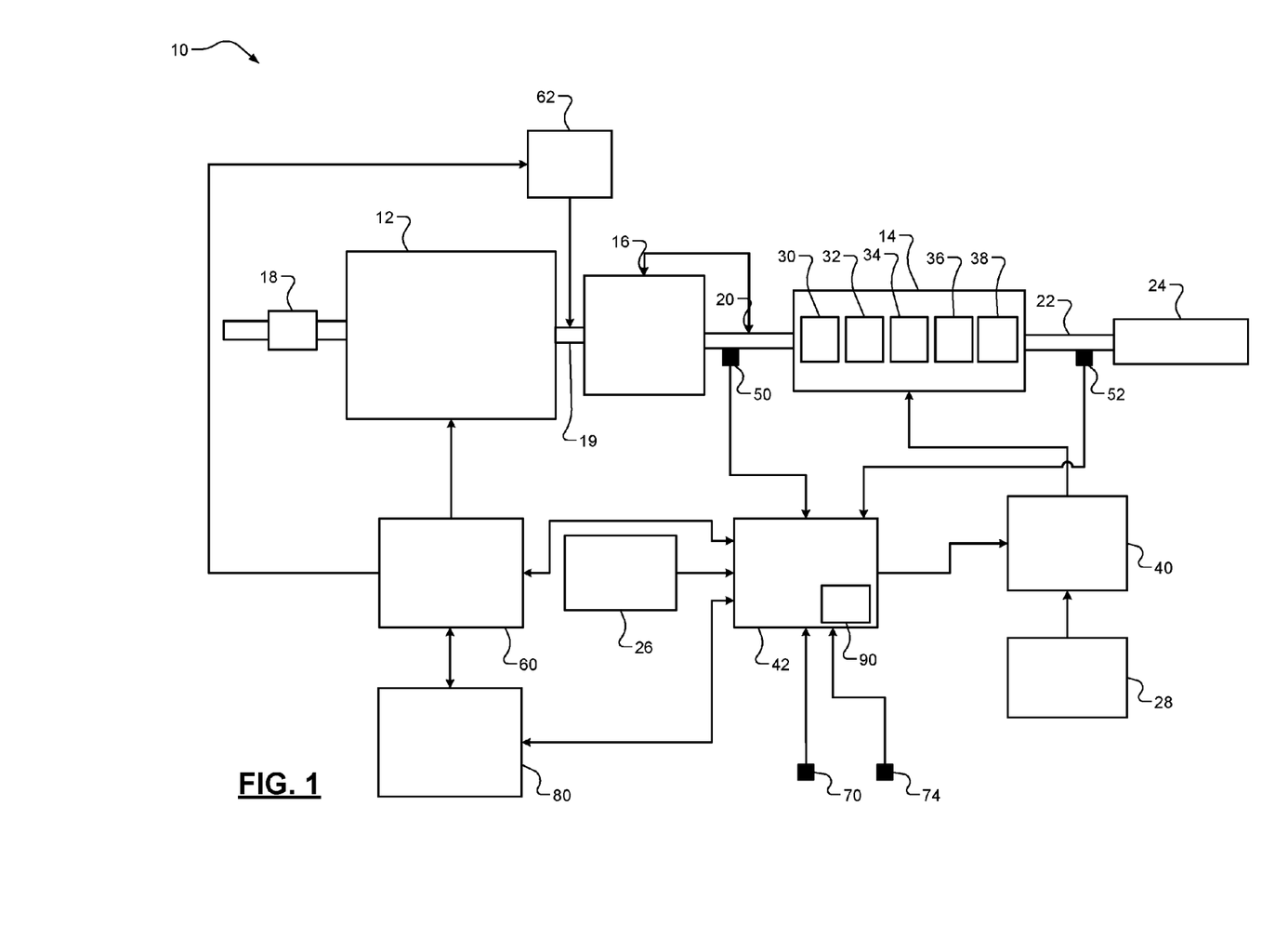
FIG. 1 is a functional block diagram of an example vehicle system including a clutch-to-clutch transmission.

Referring now to FIG. 1, a functional block diagram of an example vehicle system 10 is presented. An engine 12 drives a transmission 14 via a torque converter 16. The engine 12 may include, for example, a spark-combustion type engine, a compression-combustion type engine, and/or another suitable type of engine. In some types of vehicles, one or more electric motors may be used in addition to or as an alternative to the engine 12.

Air is drawn into the engine 12 through a throttle 18. The air is mixed with fuel and combusted within cylinders (not shown) of the engine 12 to produce torque. The engine 12 outputs torque to the torque converter 16 via a crankshaft 19. The torque converter 16 supplies the torque to the transmission 14 via a transmission input shaft 20.

While the transmission 14 is shown and will be discussed as including a clutch-to-clutch type transmission, the transmission 14 may include another suitable type of transmission, such as a dual clutch transmission (DCT). The transmission 14 may include one or more gearsets (not shown) through which torque may be transferred between the transmission input shaft 20 and a transmission output shaft 22 when a gear ratio is engaged. The transmission output shaft 22 drives a driveline 24 of the vehicle system 10.

A range selector 26 enables a user to select a mode of operation of the transmission 14 including, but not limited to, a park mode, a reverse mode, a neutral mode, or one or more forward drive modes. The transmission 14 may be capable of achieving a plurality of gear ratios. For example only, the transmission 14 may be capable of achieving six forward gear ratios, a reverse gear ratio, and a neutral gear ratio. While the example of six forward gear ratios is provided, the transmission 14 may be capable of achieving a greater or lesser number of forward gear ratios and/or a greater number of reverse gear ratios.

A plurality of clutches, such as first, second, third, fourth, and fifth clutches 30, 32, 34, 36, and 38, respectively, control which one of the gear ratios is engaged within the transmission 14 at a given time. While the example of five clutches is provided, the transmission 14 may include a greater or fewer number of clutches. The first, second, third, fourth, and fifth clutches 30-38 will be collectively referred to hereafter as the clutches 30-38. For purposes of discussion only, the clutches 30-38 will be discussed as being controlled hydraulically, but the clutches 30-38 may be controlled in another suitable manner.

Pressurized fluid is provided to the clutches 30-38 from a regulated hydraulic pressure source 28 (e.g., a transmission fluid pump) to control engagement and disengagement of the clutches 30-38. The clutches 30-38 are coupled to the hydraulic pressure source 28 via control valves 40. The control valves 40 regulate clutch pressure by selectively supplying or discharging fluid to or from the clutches 30-38. While the control valves 40 and the pressure source 28 are illustrated separately from the transmission 14, the control valves 40 and/or the pressure source 28 may be within the transmission 14.

A transmission control module (TCM) 42 controls the clutch pressures to control the gear ratio engaged within the transmission 14 and to control shifts between two gear ratios (i.e., gear shifts). A clutch may be fully engaged when the pressure applied to that clutch is greater than a predetermined apply pressure specific to that clutch. One or more of the clutches 30-38 may be selectively engaged at a given time to achieve a given gear ratio.

A table of example clutch engagement combinations that may establish various gear ratios is provided below. Different gear ratios may be established when different combinations of one or more of the clutches 30-38 are engaged.

| Gear Ratio/Range | Clutches Engaged | | | | |
| --- | --- | --- | --- | --- | --- |
|  | 30 | 32 | 34 | 36 | 38 |
| 1 | X |  |  |  | X |
| 2 | X |  |  | X |  |
| 3 | X |  | X |  |  |
| 4 | X | X |  |  |  |
| 5 |  | X | X |  |  |
| 6 |  | X |  | X |  |
| R |  |  | X |  | X |
| N |  |  |  |  | X |

For example only, a first forward gear ratio may be established when the first and fifth clutches 30 and 38 are engaged. A second forward gear ratio may be established when the first and forth clutches 30 and 36 are engaged. A third forward gear ratio may be established when the first and third clutches 30 and 34 are engaged. A fourth forward gear ratio may be established when the first and second clutches 30 and 32 are engaged. A fifth forward gear ratio may be established when the second and third clutches 32 and 34 are engaged. A sixth forward gear ratio may be established when the second and fourth clutches 32 and 36 are engaged. The reverse gear ratio may be established when the third and fifth clutches 34 and 38 are engaged. The neutral gear ratio may be established when only the fifth clutch 38 is engaged. As the numerical title attributed to the forward gear ratios increases, the gear ratio (i.e., ratio of transmission input speed over transmission output speed) decreases. For example only, the gear ratio associated with the first forward gear ratio is greater than the gear ratio associated with the second gear ratio.

A gear shift between successive forward gear ratios is accomplished by disengaging a first one of the clutches 30-38 and engaging a second one of the clutches 30-38 while the engagement of a third one of the clutches 30-38 is maintained. The engagement and the disengagement of the first and second ones of the clutches 30-38 may be performed in concert. The clutch being disengaged for a gear shift is referred to as the offgoing clutch, and the clutch being engaged for a gear shift is referred to as the oncoming clutch.

For example only, a gear shift from the first forward gear ratio to the second forward gear ratio may be accomplished by disengaging the fifth clutch 38, engaging the fourth clutch 36, and maintaining the first clutch 30 as engaged. A gear shift from the second forward gear ratio to the third forward gear ratio may be accomplished by disengaging the fourth clutch 36, engaging the third clutch 34, and maintaining the first clutch 30 as engaged. A gear shift from the third forward gear ratio to the fourth forward gear ratio may be accomplished by disengaging the third clutch 34, engaging the second clutch 32, and maintaining the first clutch 30 as engaged. A gear shift from the fourth forward gear ratio to the fifth forward gear ratio may be accomplished by disengaging the first clutch 30, engaging the third clutch 34, and maintaining the second clutch 32 as engaged. A gear shift from the fifth forward gear ratio to the sixth forward gear ratio may be accomplished by disengaging the third clutch 34, engaging the fourth clutch 36, and maintaining the second clutch 32 as engaged.

A gear shift from an N-th forward gear ratio to an M-th forward gear ratio, where M is greater than N, may be referred to as an upshift. In contrast, a gear shift from an N-th forward gear ratio to an M-th forward gear ratio, where M is less than N, may be referred to as a downshift.

A transmission input shaft speed (TISS) sensor 50 measures a rotational speed of a turbine (not shown) of the torque converter 16 and generates a turbine speed signal based on the rotational speed of the turbine. In various implementations, the TISS sensor 50 may measure rotational speed of the transmission input shaft 20 or another suitable transmission input speed. A transmission output shaft speed (TOSS) sensor 52 measures rotational speed of the transmission output shaft 22 and generates an output shaft speed signal based on the rotational speed of the transmission output shaft 22.

An engine control module (ECM) 60 controls operation of the engine 12. For example only, the ECM 60 may control opening of the throttle 18, fueling provided to the engine 12, and other suitable engine actuators. The ECM 60 controls the engine actuators based on driver input, such as an accelerator pedal position, a brake pedal position, cruise control input, and/or one or more other suitable driver inputs.

The ECM 60 may also control a motor generator unit (MGU) 62. The MGU 62 may selectively supplement the engine torque under some circumstances. The MGU 62 may also apply a load (i.e., a negative torque relative to combustion torque) under some circumstances, such as during regenerative braking. Regenerative braking may be performed, for example, to generate electrical energy for the vehicle system 10. The MGU 62 may include, for example, a belt alternator starter (BAS) or another suitable type of MGU. While the MGU 62 is shown in the example embodiment of FIG. 1 as interfacing the crankshaft 19 between the engine 12 and the torque converter 16, the MGU 62 may interface the crankshaft 19 in another suitable manner, such as via a belt-pulley system.

The vehicle may also include one or more other sensors, such as a longitudinal acceleration sensor 70 and one or more wheel speed sensors 74. The longitudinal acceleration sensor 70 measures a longitudinal acceleration of the vehicle and generates a longitudinal acceleration signal based on the longitudinal acceleration of the vehicle. Wheel speed sensors measure speeds of respective wheels. A vehicle speed may be determined based on one or more wheel speeds, such as an average of driven (i.e., transmission output torque receiving) wheels.

The vehicle may also include one or more other control modules, such as a braking control module (BCM) 80. A driver actuates a brake pedal to apply mechanical brakes and slow the vehicle. The BCM 80 determines a braking force on the vehicle applied via the mechanical brakes. For example, the BCM 80 may determine the braking force based on a pressure within a brake master cylinder using one or more functions or mappings that relate that pressure to braking force.

The ECM 60, the TCM 42, the BCM 80, and other control modules may communicate and/or share one or more parameters. For example only, the ECM 60 may determine an axle torque (torque at the axles) and communicate the axle torque to the TCM 42. The BCM 80 may determine the braking force and communicate the braking force to the TCM 42.

A clutch control module 90 determines an estimated acceleration (or deceleration when negative) of the vehicle based on the axle torque, the braking force, aerodynamic drag force on the vehicle, and road load force on the vehicle.

When the vehicle is decelerating, the clutch control module 90 may take one or more remedial actions when the estimated acceleration is greater than a deceleration measured based on transmission output speed and/or output from the longitudinal acceleration sensor 70. For example, the clutch control module 90 may shift the transmission 14 to a neutral state. The clutch control module 90 may also identify a clutch that is at least partially applied and shift to a gear that is associated with that clutch being applied.

Figure 2:
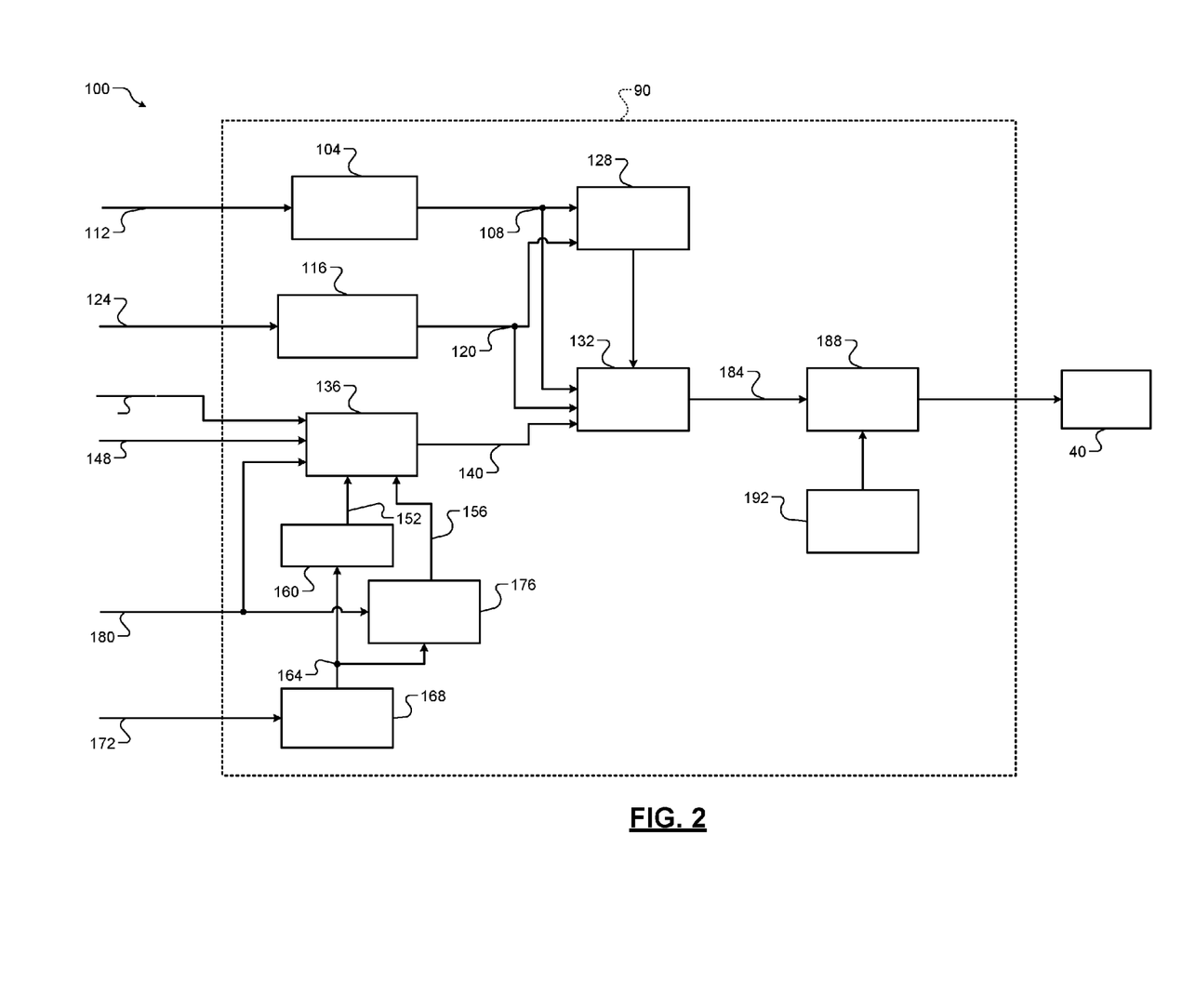
FIG. 2 is a functional block diagram of an example clutch control module.

Referring now to FIG. 2, a functional block diagram of clutch control system 100 including an example implementation of the clutch control module 90 is presented. While the clutch control module 90 is illustrated as being within the TCM 42, the clutch control module 90 may be implemented in another module or independently.

The clutch control module 90 includes a first measured acceleration module 104 that determines a first (longitudinal) acceleration 108 of the vehicle based on a transmission output shaft speed (TOSS) 112. For example, the TOSS 112 may be sampled every predetermined period, and the first measured acceleration module 104 may determine the first acceleration 108 based on a change in the TOSS 112 over a predetermined period between samples of the TOSS 112. In various implementations, the first measured acceleration module 104 may determine the first acceleration 108 based on a derivative of the TOSS 112. The TOSS 112 may be measured using the TOSS sensor 52. Negative values of the first acceleration 108 indicate deceleration.

A second measured acceleration module 116 determines a second (longitudinal) acceleration 120 of the vehicle based on a longitudinal acceleration 124 measured using the longitudinal acceleration sensor 70. Negative values of the second acceleration 120 again indicate deceleration.

An enabling/disabling module 128 enables and disables a deceleration module 132 based on the first acceleration 108 of the vehicle and the second acceleration 120 of the vehicle. The enabling/disabling module 128 may enable the deceleration module 132 when both the first acceleration 108 and the second acceleration 120 are less than zero (i.e., negative). In other words, the enabling/disabling module 128 may enable the deceleration module 132 when the first and second accelerations 108 and 120 both indicate that the vehicle is decelerating. Conversely, the enabling/disabling module 128 may disable the deceleration module 132 when one or both of the first acceleration 108 and the second acceleration 120 is greater than or equal to zero.

An estimated acceleration module 136 determines an estimated (longitudinal) acceleration 140 of the vehicle based on an axle torque 144, a braking force 148, an aerodynamic drag 152 force on the vehicle, and a road load 156 force on the vehicle. The axle torque 144 may correspond to a present torque at axles coupled to driven wheels of the vehicle. The ECM 60 may determine the axle torque 144 (e.g., in Nm) using one or more functions or mappings that relate current operating parameters to axle torques. The current operating parameters may include, for example, throttle opening, spark timing, air/fuel ratio, intake and exhaust cam phasing, exhaust gas recirculation, and/or one or more other operating parameters. The estimated acceleration module 136 may convert the axle torque 144 into an axle force (e.g., in N) based on a radius of the wheels of the vehicle. The radius of the wheels may be a predetermined value and stored in memory. Positive values of axle force indicate acceleration of the vehicle, while negative values of axle force indicate deceleration of the vehicle. Negative values of axle force may occur when the torque output of the engine 12 is low such that the engine 12 causes negative torque at the axles relative to inertia based torque at the axles.

The braking force 148 (e.g., in N) may correspond to a present force imposed on the vehicle via mechanical braking. The BCM 80 may determine the braking force 148, for example, using one or more functions or mappings that relate the pressure within the master cylinder to braking force. The braking force 148 may be a value between 0 and a predetermined maximum negative value. The braking force 148 may be zero the mechanical brakes are not being used to slow the vehicle. The braking force 148 may become more negative as application of the mechanical brakes increases.

The aerodynamic drag 152 (e.g., in N) corresponds to a present aerodynamic drag on the vehicle. Aerodynamic drag urges deceleration of the vehicle. An aerodynamic drag module 160 may determine the aerodynamic drag 152, for example, based on a vehicle speed 164. The aerodynamic drag module 160 may determine the aerodynamic drag 152, for example, using one or more functions or mappings that relate vehicle speeds to aerodynamic drag on the vehicle. The aerodynamic drag 152 may be a value between 0 and a predetermined maximum negative value. The aerodynamic drag 152 may be zero when the vehicle speed 164 is zero. The aerodynamic drag 152 may become more negative as the vehicle speed 164 increases.

A vehicle speed module 168 may determine the vehicle speed 164, for example, based on one or more wheel speeds 172. The wheel speeds 172 may be measured using the wheel speed sensors 74. The vehicle speed module 168 may determine the vehicle speed 164, for example, by averaging one or more of the wheel speeds 172 of driven wheels of the vehicle.

The road load 156 (e.g., in N) corresponds to a present negative force on the vehicle attributable to the contact between the vehicle tires and the road (e.g., via friction). Road load urges deceleration of the vehicle while the vehicle is moving. A road load module 176 may determine the road load 156, for example, based on the vehicle speed 164 and a vehicle mass 180. The vehicle mass 180 (e.g., in kg) corresponds to a mass of the vehicle. The vehicle mass 180 may be a predetermined value stored in memory. In various implementations, the vehicle mass 180 may be learned to also include mass of occupants and other items carried by the vehicle. The road load module 176 may determine the road load 156, for example, using one or more functions or mappings that relate vehicle speeds and vehicle masses to road load. The road load 156 may be a value between 0 and a predetermined maximum negative value. The road load 156 may be zero when the vehicle speed 164 is zero. The road load 156 may become more negative as the vehicle speed 164 increases. At a given vehicle speed, the road load 156 may become more negative as the vehicle mass 180 increases.

The estimated acceleration module 136 may determine a total force based on the axle force (determined based on the axle torque 144), the braking force 148, the aerodynamic drag 152, and the road load 156. For example, the estimated acceleration module 136 may set the total force based on or equal to a sum of the axle force, the braking force 148, the aerodynamic drag 152, and the road load 156.

The estimated acceleration module 136 determines the estimated acceleration 140 based on the total force and the vehicle mass 180. For example, the estimated acceleration module 136 may set the estimated acceleration 140 based on or equal to the total force divided by the vehicle mass 180.

When enabled, the deceleration module 132 generates a deceleration signal 184 based on the first acceleration 108, the second acceleration 120, and the estimated acceleration 140. For example, the deceleration module 132 may set the deceleration signal 184 to a first state when the estimated acceleration 140 is greater than both of the first and second accelerations 108 and 120 (which are negative) by at least a predetermined amount. An example of the predetermined amount is approximately 0.2 g (normal gravity), but another suitable value may be used. The deceleration module 132 may set the deceleration signal 184 to a second state when the estimated acceleration 140 is not greater than both of the first and second accelerations 108 and 120 by at least the predetermined amount.

The estimated acceleration 140 being greater than both of the first and second accelerations 108 and 120 by at least the predetermined amount may indicate that the vehicle may be decelerating faster than the driver may expect. This may occur, for example, due to application (e.g., partial) of a clutch that should not be applied. Application of a clutch that should not be applied may be referred to as tie-up and may cause deceleration of the vehicle. Clutch application may also be referred to as clutch engagement.

When the deceleration signal 184 is in the first state, a pressure control module 188 may control the control valves 40 to shift the transmission 14 to a neutral state. The transmission 14 does not transfer torque between the transmission input shaft 20 and the transmission output shaft 22 when in the neutral state. The pressure control module 188 may shift the transmission 14 to the neutral state, for example, by disengaging and/or engaging one or more clutches.

In various implementations, the pressure control module 188 may reset a timer value tracked by a timer module 192 when the deceleration signal 184 is in the second state. The pressure control module 188 may increment the timer value when the deceleration signal 184 is in the first state. The pressure control module 188 may control the control valves 40 to shift the transmission 14 to the neutral state when the timer value is greater than a predetermined period. In other words, the pressure control module 188 may require that the deceleration signal 184 be in the first state for the predetermined period or a predetermined number of control loops before shifting the transmission 14 to the neutral state.

The pressure control module 188 may also monitor slip of the clutches that were not to be applied to achieve the present gear ratio when the deceleration signal 184 is in the first state. Slip of a clutch may correspond to a difference between an input speed to the clutch and an output speed of the clutch. The slip of a clutch that was not to be applied to achieve the present gear ratio being low, such as less than a predetermined speed, may indicate that the clutch was at least partially applied. The clutch being at least partially applied when it was not to be applied may have caused deceleration. Slip of a clutch may be measured using measured input and output speeds of a clutch. Slip of a clutch may be estimated, for example, based on which one or more clutches are commanded to be applied and a transmission lever node design.

The pressure control module 188 may therefore determine a gear ratio of the transmission 14 that can be achieved with that clutch (having low slip) applied and controls the control valves 40 to apply that clutch and one or more other clutches to achieve the gear ratio. This may shift the transmission 14 to a state where vehicle deceleration may proceed more smoothly or as expected by the driver. As stated, while the example of a clutch-to-clutch transmission is described, the deceleration detection and shifting to neutral is applicable to other types of transmissions, such as DCTs and continuously variable transmissions (CVTs). The clutch slip identification, however, is not applicable to CVTs.

Figure 3:
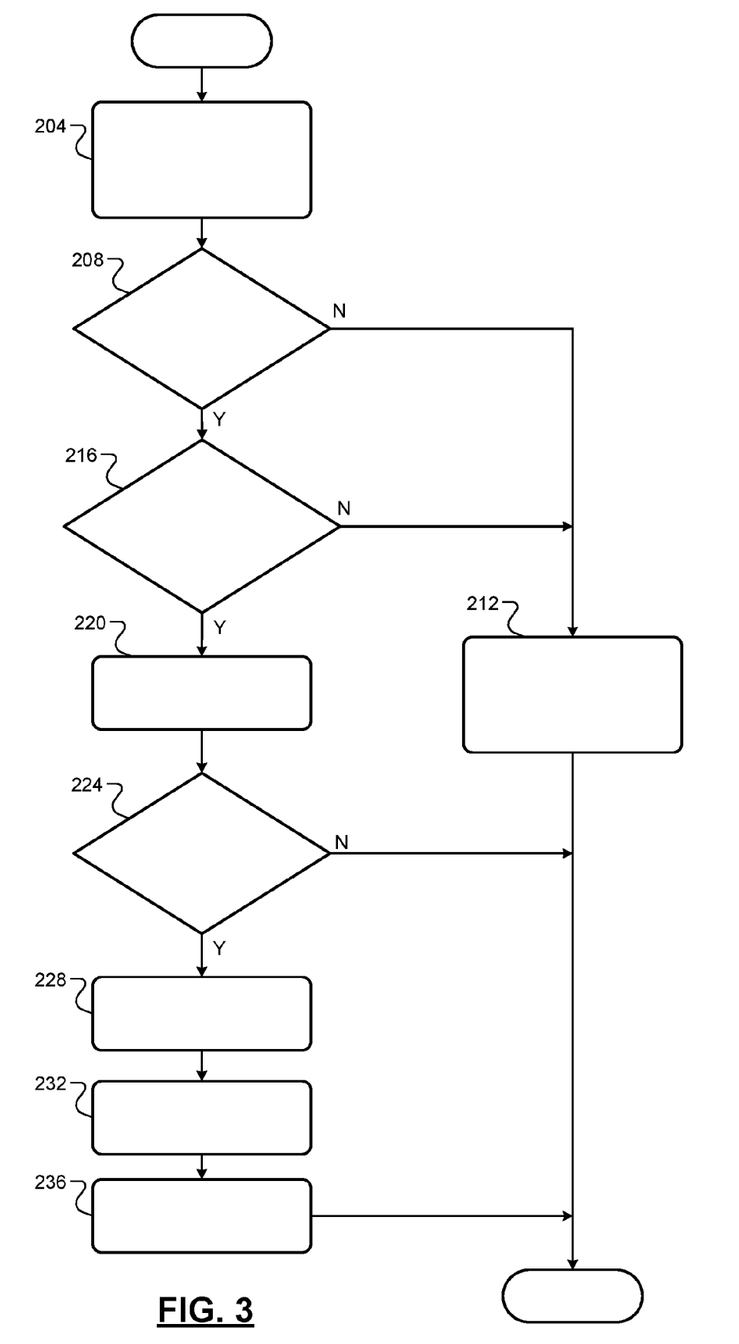
FIG. 3 is a flowchart depicting an example method of controlling a transmission based on an estimated acceleration/deceleration of a vehicle.

FIG. 3 is a flowchart depicting an example method of controlling a transmission based on an estimated acceleration of a vehicle. Control begins with 204 where the first, second, and estimated accelerations 108, 120, and 140 are determined. The first measured acceleration module 104 determines the first acceleration 108 of the vehicle based on the TOSS 112 measured using the TOSS sensor 52. The second measured acceleration module 116 determines the second acceleration 120 of the vehicle based on the longitudinal acceleration 124 measured using the longitudinal acceleration sensor 70.

The estimated acceleration module 136 determines the estimated acceleration 140 of the vehicle. As described above, the estimated acceleration module 136 sets the estimated acceleration 140 based on or equal to the total force on the vehicle divided by the vehicle mass 180. The estimated acceleration module 136 sets the total force on the vehicle based on or equal to a sum of the axle force determined based on the axle torque 144, the braking force 148, the aerodynamic drag 152, and the road load 156.

At 208, the enabling/disabling module 128 determines whether the first acceleration 108 and the second acceleration 120 are less than zero (i.e., indicative of the vehicle decelerating). If 208 is false, control continues with 212. At 212, the enabling/disabling module 128 disables the deceleration module 132, the pressure control module 188 resets the timer value tracked by the timer module 192, and the pressure control module 188 controls the control valves 40 based on normal operation. Control may then end. If 208 is true, the enabling/disabling module 128 enables the deceleration module 132, and control continues with 216.

The deceleration module 132 determines whether the estimated acceleration 140 is greater than both the first and second accelerations 108 and 120 by at least the predetermined amount at 216. For example only, the predetermined amount may be approximately 0.2 g (standard gravitational acceleration) or another suitable value. If 216 is false, control transfers to 212, as discussed above. If 216 is true, control continues with 220.

At 220, the deceleration module 132 sets the deceleration signal 184 to the first state, and the pressure control module 188 increments the timer value tracked by the timer module 192 and control continues with 224. While the example of a timer, a timer value, and a predetermined period are provided, in various implementations, a counter, a counter value, and a predetermined value may be used.

The pressure control module 188 may determine whether the timer value tracked by the timer module 192 is greater than a predetermined period at 224. The predetermined period may be greater than zero. If 224 is true, control continues with 228. If 224 is false, the pressure control module 188 may continue to control the control valves 40 based on normal operation, and control may end.

At 228, when the timer value is greater than the predetermined period, the pressure control module 188 controls the control valves 40 to shift the transmission 14 to the neutral state. For example, the pressure control module 188 may control the control valves 40 to apply one or more of the clutches and/or disengage one or more of the clutches, depending on which clutches are applied to achieve the present gear ratio.

At 232, the pressure control module 188 may identify which clutch that was to be disengaged to achieve the present gear ratio had/has low slip. The pressure control module 188 may also identify a gear ratio of the transmission 14 corresponding to that clutch being applied. At 236, the pressure control module 188 may control the control valves 40 to apply that clutch to achieve the identified gear ratio. Control may then end. While the example of FIG. 3 is shown as ending, FIG. 3 may be illustrative of one control loop and control may begin a new control loop each predetermined period.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A transmission control system of a vehicle, comprising:
   an estimated acceleration module that determines an estimated longitudinal acceleration of the vehicle based on a force at axles of the vehicle corresponding to engine torque, a braking force imposed by mechanical brakes of the vehicle, an aerodynamic drag force of the vehicle, and a road load force imposed on the vehicle by contact between tires of the vehicle and a road surface; and
   a pressure control module that, when a measured longitudinal acceleration of the vehicle is negative and the estimated longitudinal acceleration is greater than the measured longitudinal acceleration of the vehicle, adjusts transmission fluid pressure applied to one or more clutches of the transmission and shifts the transmission to neutral.

2. The transmission control system of claim 1 wherein the estimated acceleration module determines the estimated longitudinal acceleration of the vehicle further based on a mass of the vehicle.

3. The transmission control system of claim 1 wherein the estimated acceleration module:
   determines a total force on the vehicle based on a sum of:
      (i) the force at the axles of the vehicle corresponding to engine torque, (ii) the braking force imposed by the mechanical brakes of the vehicle, (iii) the aerodynamic drag force on the vehicle, and (iv) the road load force imposed on the vehicle; and
   sets the estimated longitudinal acceleration of the vehicle based on the total force on the vehicle divided by a mass of the vehicle.

4. The transmission control system of claim 1 further comprising a measured acceleration module that determines the measured longitudinal acceleration of the vehicle based on a change in a transmission output shaft speed over a period.

5. The transmission control system of claim 1 further comprising a measured acceleration module that determines the measured longitudinal acceleration of the vehicle based on signals generated by a longitudinal acceleration sensor of the vehicle.

6. The transmission control system of claim 1 further comprising:
   a first measured acceleration module that determines the measured longitudinal acceleration of the vehicle based on a change in a transmission output shaft speed over a period; and
   a second measured acceleration module that determines a second measured longitudinal acceleration of the vehicle based on signals generated by a longitudinal acceleration sensor of the vehicle,
   wherein the pressure control module adjusts the transmission fluid pressure applied to the one or more clutches of the transmission and shifts the transmission to neutral when:
      both the measured longitudinal acceleration and the second measured longitudinal acceleration are negative; and
      the estimated longitudinal acceleration is greater than both (i) the measured longitudinal acceleration of the vehicle and (ii) the second measured longitudinal acceleration of the vehicle.

7. The transmission control system of claim 6 wherein the pressure control module adjusts the transmission fluid pressure applied to the one or more clutches of the transmission and shifts the transmission to neutral when, for at least a predetermined period:
both the measured longitudinal acceleration and the second measured longitudinal acceleration are negative; and
the estimated longitudinal acceleration is greater than both (i) the measured longitudinal acceleration of the vehicle and (ii) the second measured longitudinal acceleration of the vehicle.

8. The transmission control system of claim 6 wherein the pressure control module adjusts the transmission fluid pressure applied to the one or more clutches of the transmission and shifts the transmission to neutral when, for at least a predetermined period:
both the measured longitudinal acceleration and the second measured longitudinal acceleration are negative; and
the estimated longitudinal acceleration is, by at least a predetermined amount, greater than both: (i) the measured longitudinal acceleration of the vehicle and (ii) the second measured longitudinal acceleration of the vehicle.

9. The transmission control system of claim 1 wherein, when the measured longitudinal acceleration of the vehicle is negative and the estimated longitudinal acceleration is greater than the measured longitudinal acceleration of the vehicle, the pressure control module further adjusts transmission fluid pressure applied to one or more of the clutches of the transmission and shifts the transmission to a predetermined gear ratio.

10. The transmission control system of claim 1 wherein the pressure control module actuates one or more control valves of the transmission to adjust the transmission fluid pressure(s) applied to the one or more clutches of the transmission and shift the transmission to neutral.

11. A transmission control method for a vehicle, comprising:
determining an estimated longitudinal acceleration of the vehicle based on: a force at axles of the vehicle corresponding to engine torque, a braking force imposed by mechanical brakes of the vehicle, an aerodynamic drag force of the vehicle, and a road load force imposed on the vehicle by contact between tires of the vehicle and a road surface; and
when a measured longitudinal acceleration of the vehicle is negative and the estimated longitudinal acceleration is greater than the measured longitudinal acceleration of the vehicle, adjusting transmission fluid pressure applied to one or more clutches of the transmission and shifting the transmission to neutral.

12. The transmission control method of claim 11 further comprising determining the estimated longitudinal acceleration of the vehicle further based on a mass of the vehicle.

13. The transmission control method of claim 11 wherein determining the estimated longitudinal acceleration comprises:
determining a total force on the vehicle based on a sum of:
(i) the force at the axles of the vehicle corresponding to engine torque, (ii) the braking force imposed by the mechanical brakes of the vehicle, (iii) the aerodynamic drag force on the vehicle, and (iv) the road load force imposed on the vehicle; and setting the estimated longitudinal acceleration of the vehicle based on the total force on the vehicle divided by a mass of the vehicle.

14. The transmission control method of claim 11 further comprising determining the measured longitudinal acceleration of the vehicle based on a change in a transmission output shaft speed over a period.

15. The transmission control method of claim 11 further comprising determining the measured longitudinal acceleration of the vehicle based on signals generated by a longitudinal acceleration sensor of the vehicle.

16. The transmission control method of claim 11 further comprising:
determining the measured longitudinal acceleration of the vehicle based on a change in a transmission output shaft speed over a period; and
determining a second measured longitudinal acceleration of the vehicle based on signals generated by a longitudinal acceleration sensor of the vehicle;
wherein adjusting the transmission fluid pressure applied to the one or more clutches of the transmission and shifting the transmission to neutral includes adjusting the transmission fluid pressure applied to the one or more clutches of the transmission and shifting the transmission to neutral when:
both the measured longitudinal acceleration and the second measured longitudinal acceleration are negative; and
the estimated longitudinal acceleration is greater than both (i) the measured longitudinal acceleration of the vehicle and (ii) the second measured longitudinal acceleration of the vehicle.

17. The transmission control method of claim 16 wherein adjusting the transmission fluid pressure applied to the one or more clutches of the transmission and shifting the transmission to neutral includes adjusting the transmission fluid pressure applied to the one or more clutches of the transmission and shifting the transmission to neutral when, for at least a predetermined period:
both the measured longitudinal acceleration and the second measured longitudinal acceleration are negative; and
the estimated longitudinal acceleration is greater than both (i) the measured longitudinal acceleration of the vehicle and (ii) the second measured longitudinal acceleration of the vehicle.

18. The transmission control method of claim 16 wherein adjusting the transmission fluid pressure applied to the one or more clutches of the transmission and shifting the transmission to neutral includes adjusting the transmission fluid pressure applied to the one or more clutches of the transmission and shifting the transmission to neutral when, for at least a predetermined period:
both the measured longitudinal acceleration and the second measured longitudinal acceleration are negative; and
the estimated longitudinal acceleration is, by at least a predetermined amount, greater than both: (i) the measured longitudinal acceleration of the vehicle and (ii) the second measured longitudinal acceleration of the vehicle.

19. The transmission control method of claim 11 further comprising, when the measured longitudinal acceleration of the vehicle is negative and the estimated longitudinal acceleration is greater than the measured longitudinal acceleration of the vehicle, further adjusting transmission fluid pressure applied to one or more of the clutches of the transmission and shifting the transmission to a predetermined gear ratio.

20. The transmission control method of claim 11 wherein adjusting the transmission fluid pressure applied to the one or more clutches of the transmission and shifting the transmission to neutral includes actuating one or more control valves of the transmission to adjust the transmission fluid pressure(s) applied to the one or more clutches of the transmission and shift the transmission to neutral.

* * * * *